US010683578B2

(12) United States Patent
Doering et al.

(10) Patent No.: US 10,683,578 B2
(45) Date of Patent: Jun. 16, 2020

(54) SYSTEMS, DEVICES, AND METHODS FOR PORTABLE ELECTROLYZED WATER GENERATION

(71) Applicant: EcoLogic Solutions Inc., Brooklyn, NY (US)

(72) Inventors: Anselm Karl Doering, Brooklyn, NY (US); Joshua George Knight, Brooklyn, NY (US); Edward Amoako, Corona, NY (US)

(73) Assignee: EcoLogic Solutions Inc., Brooklyn, NY (US)

( * ) Notice: Subject to any disclaimer, the term of this patent is extended or adjusted under 35 U.S.C. 154(b) by 0 days.

(21) Appl. No.: 15/909,715

(22) Filed: Mar. 1, 2018

(65) Prior Publication Data
US 2018/0251902 A1 Sep. 6, 2018

Related U.S. Application Data

(60) Provisional application No. 62/465,714, filed on Mar. 1, 2017.

(51) Int. Cl.
C25B 1/46 (2006.01)
C25B 9/10 (2006.01)
(Continued)

(52) U.S. Cl.
CPC ............... *C25B 1/46* (2013.01); *A01N 37/36* (2013.01); *A01N 59/00* (2013.01); *A01N 59/08* (2013.01);
(Continued)

(58) Field of Classification Search
CPC ...... C02F 1/4618; C02F 1/467; C02F 1/4674; C25B 1/46; C25B 15/08
See application file for complete search history.

(56) References Cited

U.S. PATENT DOCUMENTS 5,858,201 A * 1/1999 Otsuka ............... A01N 59/00
205/701
2004/0137078 A1 7/2004 Najafi et al.
(Continued)

FOREIGN PATENT DOCUMENTS

| JP | 2001-225074 A | 8/2001 |
| JP | 2004-148109 A | 5/2004 |
| JP | 2016-023134 A | 2/2016 |

OTHER PUBLICATIONS

International Search Report and Written Opinion for Application No. PCT/US2018/020493, dated Apr. 26, 2018. 8 pages.

Primary Examiner — Arun S Phasge
(74) Attorney, Agent, or Firm — McCarter & English, LLP

(57) ABSTRACT

Systems and methods are provided for producing electrolyzed water. In exemplary embodiments, a fluid container capable of storing a brine solution therein is used. An electrolytic cell is disposed within the fluid container and in communication with the brine solution. A power source is in electrical communication with the electrolytic cell, a pump is disposed in the fluid container; as is a chlorometer. A fluid container head is in removable mechanical communication with the fluid container, the fluid container head including a nozzle in fluid communication with the pump, a trigger in electrical communication with the pump, and a power switch in communication with the power source. A controller is in communication with the chlorometer and the electrolytic cell, the controller operating the electrolytic cell to convert the brine solution to a cleaning solution.

19 Claims, 9 Drawing Sheets

(51) Int. Cl.
　　　*C25B 15/08*　　　(2006.01)
　　　*C25B 15/02*　　　(2006.01)
　　　*A01N 37/36*　　　(2006.01)
　　　*C11D 7/26*　　　(2006.01)
　　　*C11D 7/12*　　　(2006.01)
　　　*A01N 59/08*　　　(2006.01)
　　　*C11D 7/10*　　　(2006.01)
　　　*A01N 59/00*　　　(2006.01)
　　　*C11D 11/00*　　　(2006.01)
　　　*C11D 3/48*　　　(2006.01)

(52) U.S. Cl.
　　　CPC .................. *C11D 3/48* (2013.01); *C11D 7/10* (2013.01); *C11D 7/12* (2013.01); *C11D 7/265* (2013.01); *C11D 11/007* (2013.01); *C25B 9/10* (2013.01); *C25B 15/02* (2013.01); *C25B 15/08* (2013.01)

(56) References Cited

U.S. PATENT DOCUMENTS

| | | |
|---|---|---|
| 2009/0314651 A1 | 12/2009 | Field |
| 2014/0273052 A1 | 9/2014 | Reddy et al. |
| 2017/0036926 A1 | 2/2017 | Wilson |

* cited by examiner

SYSTEMS, DEVICES, AND METHODS FOR PORTABLE ELECTROLYZED WATER GENERATION

CROSS REFERENCE TO RELATED APPLICATIONS

The present application claims the benefit of U.S. Provisional Patent Application No. 62/465,714, filed on Mar. 1, 2017, which is incorporated herein by reference in its entirety.

BACKGROUND

Sanitizing, disinfecting, and cleaning (e.g., degreasing) surfaces often involves the use of harsh or toxic detergents. Several nontrivial challenges are presented when handling and disposing of such detergents. In addition, the amount of refuge or waste created in using single-use spray-bottle cleaners is harmful to the environment.

SUMMARY

In general, the present technology is directed to portable devices and related systems for sanitizing, disinfecting, and cleaning (e.g., degreasing) surfaces. More particularly, the present technology is related to reusable, portable devices and related systems and methods that generate one or more distinct sanitizing, disinfecting, and detergent solutions (collectively referred to herein as cleaning solutions) from non-toxic precursor starting materials (e.g., water, salt) and electricity. In an embodiment in accordance with the present technology, a mixture of water and salt is charged using an electrical cell within a ruggedized, portable cleaning device (e.g., spray bottle) to generate a sanitizing, disinfecting or cleaning solution on demand.

In one embodiment, an apparatus for producing electrolyzed water includes a fluid container capable of storing a solution therein and an electrolytic cell disposed within the fluid container and in communication with the solution. The apparatus further includes a power source in electrical communication with the electrolytic cell and a pump disposed within the fluid container, and a chlorometer disposed in the fluid container. The apparatus also includes a fluid container head in removable mechanical communication with the fluid container, the fluid container head including a nozzle in fluid communication with the pump, a trigger in electrical communication with the pump, and a power switch in communication with the power source. The apparatus additionally includes a controller in communication with the chlorometer and the electrolytic cell, the controller operating the electrolytic cell to convert the brines solution to a cleaning solution.

In another embodiment, a method for portable electrolyzed water generation is disclosed. The method includes providing an apparatus having a fluid container for storing a solution, an electrolytic cell disposed within the fluid container and in communication with the solution, a power source in electrical communication with the electrolytic cell, a pump disposed in fluid communication with the solution within the fluid container, and a chlorometer disposed in the fluid container. The method further includes providing water into the fluid container. The method additionally includes determining a solution selection from a detergent solution setting, a disinfecting solution setting and a sanitizing solution setting, and introducing a salt solution for the solution selection, the salt solution reacting with the water to provide a brine solution. The method further includes providing electro-chemical activation to the brine solution to provide a selected solution.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein.

DETAILED DESCRIPTION

Figure 1A:
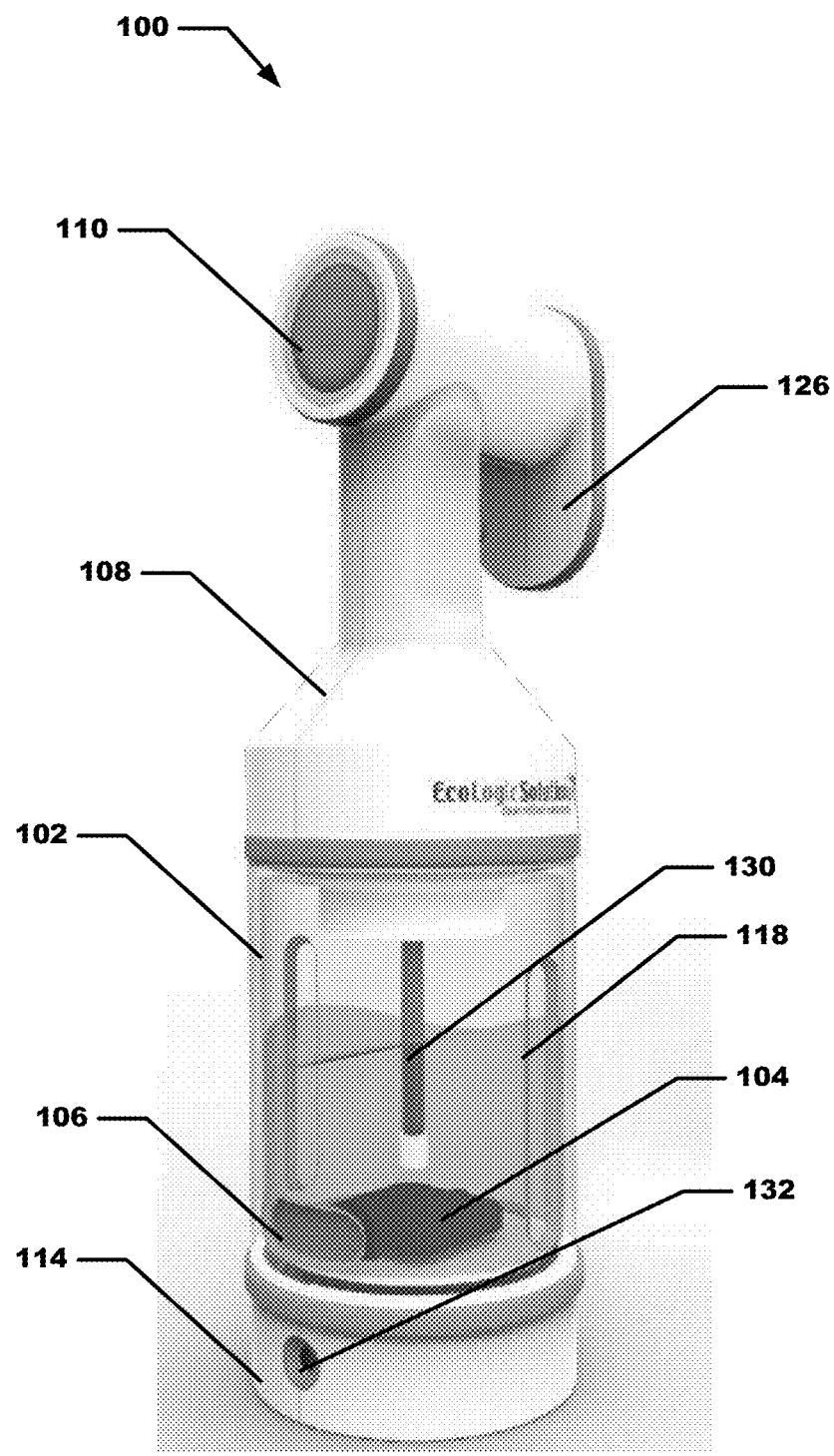
FIG. 1A is a first view of a portable cleaning device for generating a solution, according to an example embodiment.
Figures 1B, 1C:
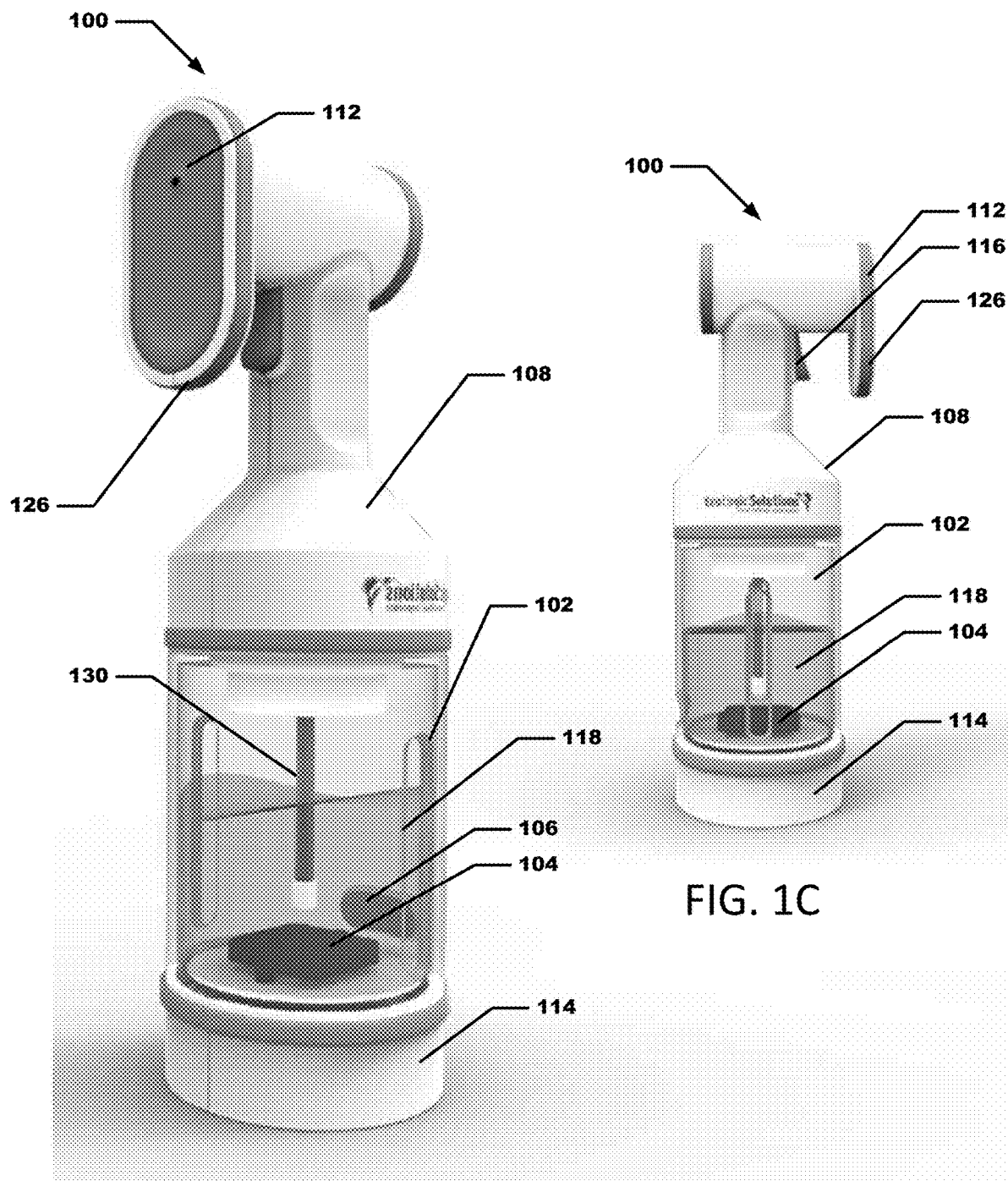
FIG. 1B is a second view of a portable cleaning device for generating a solution, according to an example embodiment.
FIG. 1C is a third view of a portable cleaning device for generating a solution, according to an example embodiment.
Figure 2A:
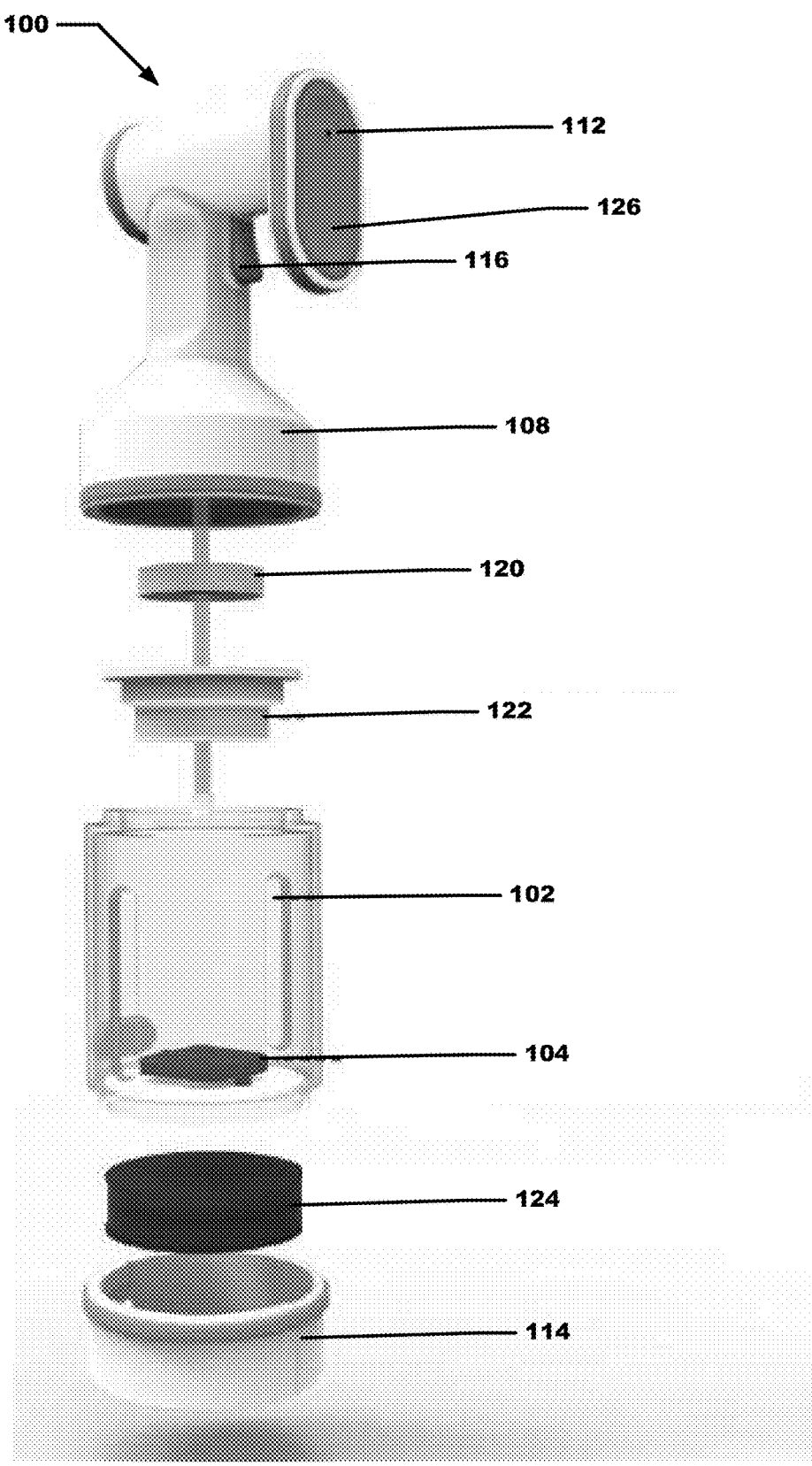
FIG. 2A is a first exploded view of a portable cleaning device for generating a solution, according to an example embodiment.
Figure 2B:
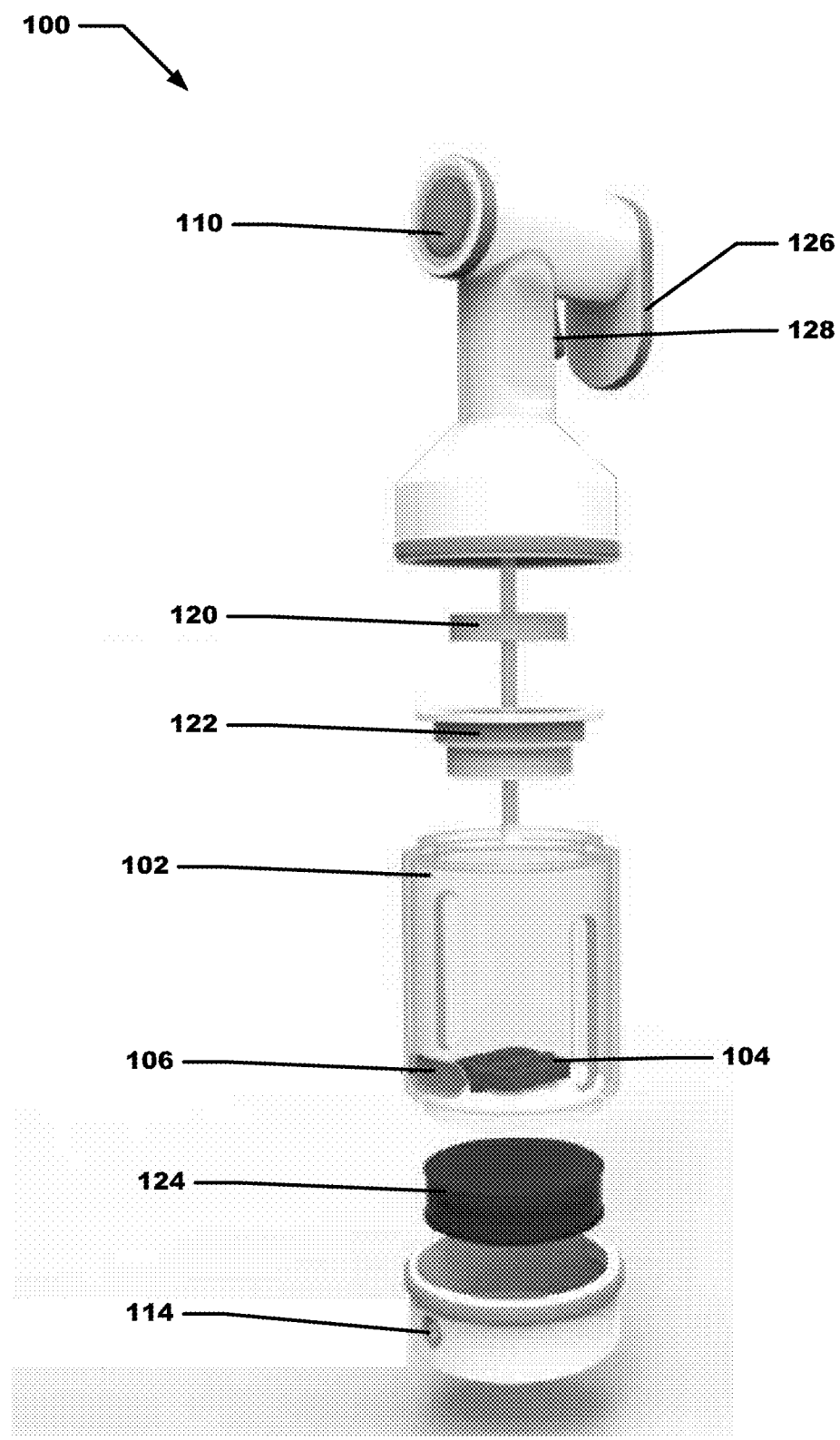
FIG. 2B is a second exploded view of a portable cleaning device for generating a solution, according to an example embodiment.

Following below are more detailed descriptions of various exemplary concepts related to generating non-toxic cleaners. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Cleaning, sanitizing, and disinfecting surfaces often involves the use of harsh and toxic chemicals, which can be less effective, bio-accumulative, persistent, hazardous, expensive, dangerous, and difficult to store or dispose of. Generating less toxic or safer sanitizing, disinfecting, or cleaning materials can often involve large machinery that is not portable and requires a plumbing system.

Embodiments of the present disclosure are directed to a portable spray bottle that can generate natural and non-toxic disinfecting, detergent, and sanitizing solutions quickly and on-site using electro chemical activation. For example, the sanitizer and disinfectant hypochlorous acid (HOCl) and mild detergent sodium hydroxide (NaOH), both of which are non-toxic to higher life forms and about 99.5% water, can be generated using salt (NaCl or KCl), water ($H_2O$), and electricity. Citric acid ($C_6H_8O_7$) may also be used in conjunction with the salt and water. These solutions can be produced on-site and can replace many hazardous and polluting cleaning, sanitizing, or disinfecting products. In addition to eliminating hazardous materials, the present technology eliminates or reduces (plastic) waste, which is beneficial to the environment. The portable cleaning device, system and methods described herein are re-usable, such that waste generated from throwing away or recycling old or used spray bottles is minimized. The portable cleaning device can be re-used, adding just water, and a compound that contains salt and may contain citric acid, and when needed additional charge to the battery. After multiple uses (e.g., 50, 100, 150, etc.) parts or portions of the portable cleaning device can be updated or replaced. For example, the water filter may be changed or cleaned in some embodiments. Similarly, the electrolytic cell may be replaced after many uses.

The small form factor of the portable spray bottle device means that users can generate safe cleaning or sanitizing materials on-demand. The disinfecting and sanitizing solutions as well as a separate detergent can be generated within minutes, in some embodiments. Embodiments of the present disclosure can be used to generate sanitizing and disinfecting solutions as well as detergents for use in homes, restaurants, hotels, supermarkets, hospitals, schools, contract cleaning companies, retailers, bottling companies, food manufacturers, and a wide variety of well-known commercial users.

Methodologies, systems, apparatus, and non-transitory computer-readable media are described herein to facilitate generating disinfecting or sanitizing solutions using a portable electrolyzed water generator. In exemplary embodiments, electro chemical activation (ECA) is used to generate electrolyzed water by charging a brine solution of water and salt using quickly dissipating volts of electricity. In some embodiments, the electricity applied to the brine solution can be between about 100-240 volts AC, between about 2-7 amps current, and between about 50-60 Hz. In other embodiments, a charge of about 9 volts DC and about 3.5 amps can be used. Exemplary embodiments of this calibrated electrolyzing process can generate two distinct liquid solutions: 1) a hypochlorous acid-based solution (HOCl) suitable for disinfecting and/or sanitizing, and 2) a sodium hydroxide (NaOH) based solution suitable for cleaning or degreasing (i.e., a detergent). When salt water ($H_2O+NaCl$) passes through a specially lined electrolyzing chamber, chlorine (Cl) ions can be attracted to a positive electrical charge, converting them to hypoclorous acid (HOCl). Similarly, sodium (Na) ions can be attracted to a negative charge and converted to sodium hydroxide (NaOH). In exemplary embodiments, depending on the concentration of free available chlorine, the solution can be a sanitizing cleaner or a disinfectant cleaner. For example, in some embodiments a sanitizing cleaner can include a solution with a concentration of free available chlorine of roughly 100 ppm and a pH level of the neutral range, and a disinfectant cleaner can include a solution with a concentration of free available chlorine of 500 ppm and a pH level of a neutral range. The desired free available chlorine concentration within the solution can be achieved, in some embodiments, by controlling/selecting a salt (and its concentration within the water) and/or the charging time of the electrolyzing process.

Referring to FIGS. 1A to 1C, 2A to 2B, 3 and 4, the portable cleaning device 100 can include a fluid container 102 configured to hold an amount of water 118, for example, 12-20 ounces. In some embodiments, the device also includes a replaceable filter 120 within the container that can remove impurities from the water as it is introduced into the fluid container. In some embodiments, the device does not include a water filter within the container. The device also includes an electrolytic cell 104 with an anode and a cathode within the fluid container, and a battery 124 for providing power to the electrolytic cell and other electric power elements (pumps, lights, etc.). The battery can be a rechargeable battery, in some embodiments. The battery is disposed in base 114, and may include a battery port 132.

An additive compound that contains citric acid ($C_6H_8O_7$) and a salt can be introduced into the fluid container after water has been introduced and filtered, and the salt can include, for example, sodium chloride (NaCl) and potassium chloride (KCl). Once the NaCl or KCl is introduced into the water within the fluid container, the electrolytic cell can provide electricity to the brine solution via the anode and/or the cathode.

The device also includes a bottle head portion 108 that can engage with the fluid container 102 and includes an electric trigger or button 116 configured to operate a pump for pumping fluid from the fluid container, via tube 130, through a nozzle 112 when the trigger is pressed. The nozzle also includes a trigger guard 126 which prevents accidental activation of the device in the event the device is dropped or mishandled A protective guard or group of guards (shown in FIG. 7) may also be included to protect the device in the event the device is dropped or knocked over. The device also includes a mode light 110 that can illuminate at different colors depending on whether the system is on, off, in a sanitizing mode, or in a disinfecting mode. For example, when the device is off, the mode light can also be off. When the device is on, the mode light can be illuminated blue, for example. When the device is on and ready for sanitizing (i.e. holding an amount of a sanitizing cleaner), the mode light can be illuminated red. When the device is on and ready for disinfecting (i.e. holding an amount of a disinfecting cleaner), the mode light can be illuminated green. A chlorometer 106 can provide a visual indication of a characteristic of the fluid within the fluid container, for example, the free available Chlorine parts per million (FAC ppm) level of the fluid. In some embodiments, a probe or sensor can be used to read the ionic activity concentration of the solution within the fluid container.

The device can also include a Liquid Crystal Display (LCD) screen that can display, among other things in real time, the ppm concentration of FAC within the solution. In some embodiments, the pH level of a solution can be reduced using citric acid pre electrolysis in order to get a neutral pH level with sodium hydroxide and chlorine in HOCl form.

Various salts that can be used to generate solutions via electro chemical activation include, for example, sodium chloride (NaCl), potassium chloride (KCl), potassium carbonate ($K_2Cl_3$), sodium bicarbonate ($NaHCO_3$), etc. In some embodiments, the active compound that includes citric acid and salt can be in the form of a tablet, a powder, or a liquid solution. In some embodiments, sodium chloride (NaCl) can be used to make a detergent and/or a sanitizing solution, as described above. Similarly, sodium hydroxide (NaOH), which is a mild detergent suitable for cleaning and degreasing, can be generated because the sodium (Na) ions can be attracted to the cathode of the electrolytic cell. Potassium chloride (KCl) or sodium chloride (NaCl) can be used, in some embodiments, to make a sanitizing or disinfecting solution because the chlorine (Cl) ions can be attracted to the anode of the electrolytic cell. In other embodiments, the systems and devices disclosed herein can be implemented to generate a degreaser or detergent with no free available chlorine and an alkali pH level of 11-12.

Depending on the type of salt introduced, the portable cleaning device can generate a sanitizing solution, a disinfectant solution, or a detergent. Once the salt has been combined with the water, the removable filter can be replaced in the fifth stage, shown in the bottom center. An operator of the portable cleaning device can then press the start on/off button and begin electro chemical activation of the solution within the fluid container. In some embodiments, the sanitizing or cleaning solution can be ready to use after a charging time of about thirty seconds to about three minutes. In some embodiments, increasing the charging time can increase the concentration of free available chlorine. The variables that can determine the type of solution generated include 1) the type of precursor salt used (e.g., chemical composition, concentration), and 2) the charging time. For example, a particular charging time can result in a sanitizing cleaner with 100 ppm of free available chlorine and a neutral pH level, while another longer charging time can result in a disinfecting cleaner with 500 ppm of free available chlorine an a neutral pH level. In some embodiments, the FAC ppm level of a solution can be reduced using citric acid pre electrolysis in order to get a neutral pH level. Examples of various additives and charging times used for making various solutions are provided below in Table 1. In some embodiments, the additives or ingredients shown in Table 1 are added in a pre-blended liquid form that facilitates dispersion into 8 fluid ounces of filtered pH neutral H2O.

TABLE 1

| Power | Additive 1 | Additive 2 | Charge Time | Chlorine Concentration | Solution pH | Solution Application |
|---|---|---|---|---|---|---|
| DC 12 V/4 A | 0.2 g Citric Acid | 2 g NaCl | 60 seconds | 100 ppm | 6 pH | Sanitizing Cleaner |
| DC 12 V/5 A | 0.2 g Citric Acid | 2.5 g NaCl | 90 seconds | 500 ppm | 6 pH | Disinfectant Cleaner |
| DC 12 V/7 A | 2 g Potassium Carbonate | | 90 seconds | 0 ppm | 12.5 pH | Hard Surface Cleaner |

In some embodiments, the difference between the sanitizing cleaner precursor salt and the disinfecting cleaner precursor salt can be a difference in concentration of NaCl and/or potassium carbonate (KC). Once the proper salt compound has been added, the electro chemical activation can begin and a chlorometer can provide a visual indication of the FAC ppm level of the resulting solution, along with a visual LED light of a certain color to indicate a certain type of ready-to-use cleaning, sanitizing, or disinfecting product. In some embodiments, differences in the electro chemical activation time can result in different concentrations of free available chlorine in the end solution.

A microcontroller can execute code or software and send informational signals and commands to all of the electrical elements and the electromechanical parts. A timer switch can be used for switching between sanitizing, disinfecting, or detergent settings while keeping time with a timer coded into the microcontroller, and a trigger or button switch can be used to activate a pump and pump fluid through the nozzle of the portable cleaning device. LED lights can be controlled by the microcontroller and can correspond to different settings, such as sanitizing, disinfecting, or detergent settings. The microcontroller is also adapted to prevent overcharging the solution.

Figure 3:
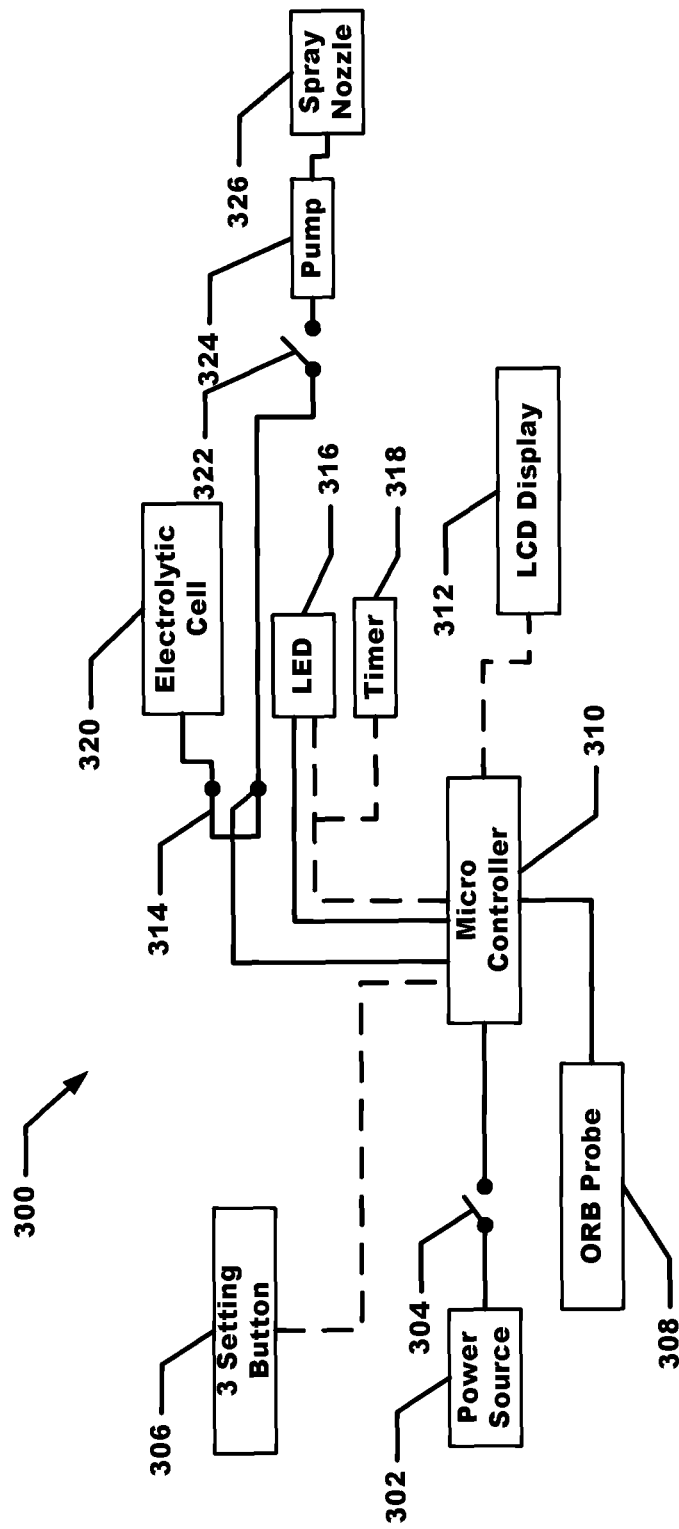
FIG. 3 is a block diagram of a portable cleaning device for generating a solution, according to an example embodiment.

Referring now to FIG. 3, a block diagram of a particular embodiment of the apparatus 300 for generating electrolyzed water is shown. An input power circuit 302 and switch 304 power the electromechanical components of the portable cleaning device, and a microcontroller 310 can execute code or software and send informational signals and commands to all of the LED elements 316 and the electromechanical parts. A switch 306 can be used for switching between sanitizing, disinfecting, or detergent settings while keeping time with a timer 318 coded into the microcontroller 310. A trigger or button switch 322 can be used to activate a pump 324 and pump fluid through the nozzle 326 of the portable cleaning device. In this example embodiment, two LED lights 316 can be controlled by the microcontroller 310 and can correspond to different settings, such as sanitizing, disinfecting, or detergent settings. A relay 314 receives a signal from the microcontroller 310 after pressing the timer button and switches the electrical current between the electrolytic cell 320 and pump 324. In some embodiments, an LCD screen 312 will display ppm readings received from ORB probe (chlorometer) 308.

Figure 4:
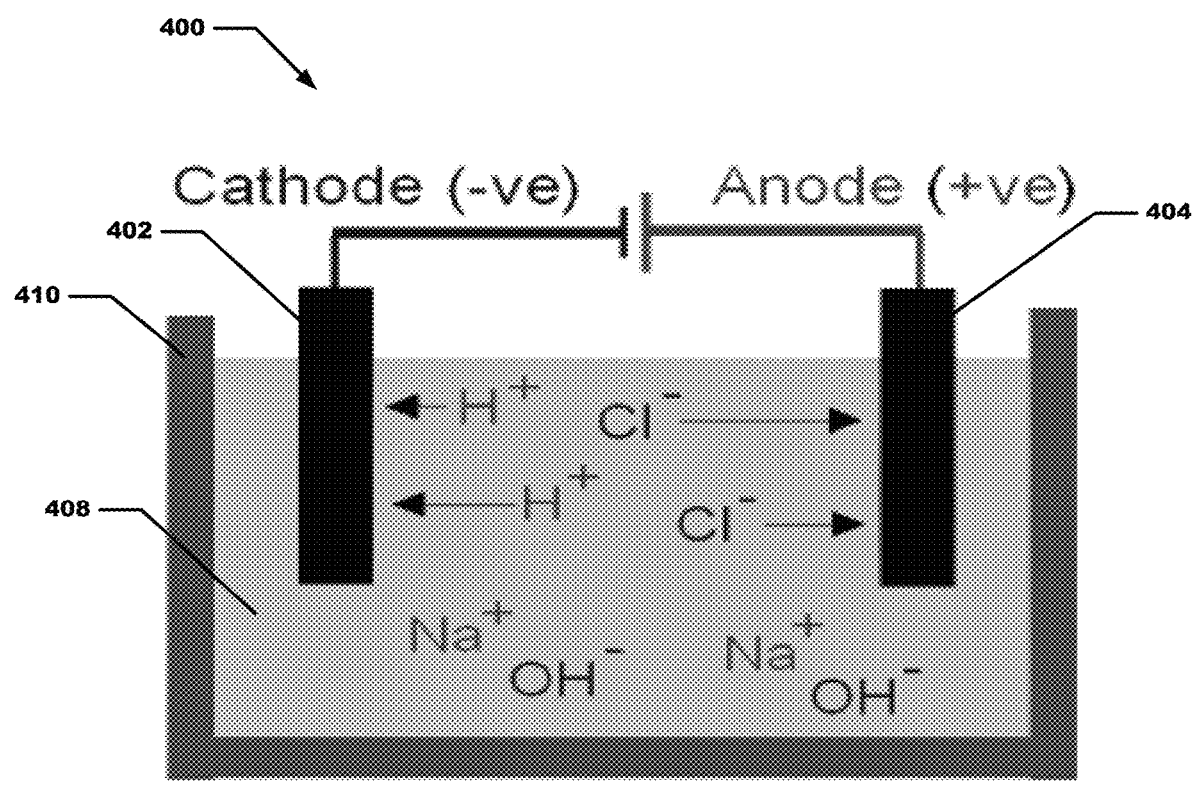
FIG. 4 is a block diagram showing the electrolytic process for the portable cleaning device for generating a solution, according to a first example embodiment.

FIG. 4 shows a portion of the cleaning device with a single fluid containment portion 410. The anode 404 provides HOCl in an H2O base 408, while the cathode 402 provides NaOH in an H2O base. The two fluids can be combined to neutralize the HOCl to get it closer to a neutral pH.

Figure 5:
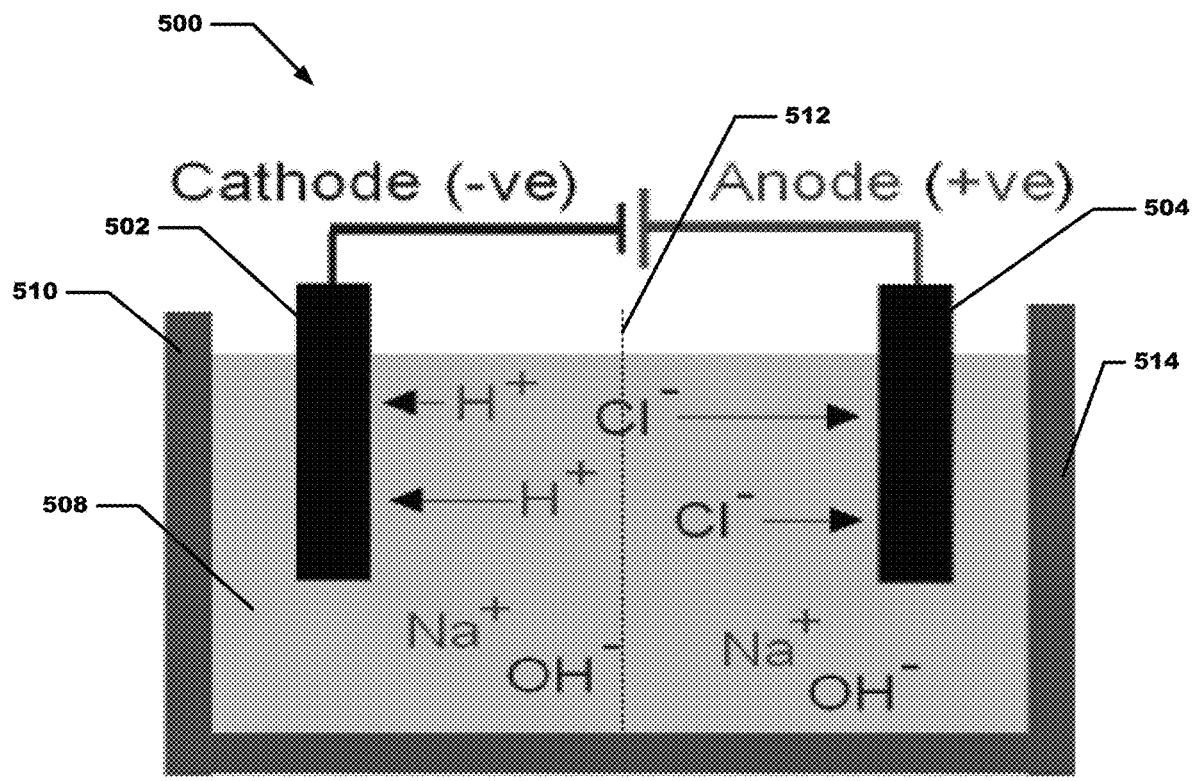
FIG. 5 is a block diagram showing the electrolytic process for the portable cleaning device for generating a solution, according to a second example embodiment.

In another embodiment, as shown in FIG. 5, the fluid container 102 of portable cleaning device 100 can include two chambers 510 and 514, each housing one of the anode 504 or the cathode 502 of the electrolytic cell, and the two chambers can be separated by a porous membrane 512 that allows ions to move to the side they are naturally drawn. For example, the chamber 514 with the anode can hold the pure HOCl in an H2O base, while the chamber 510 with the cathode can hold pure NaOH in an H2O base. In such embodiments, different streams of the two fluids can be combined to neutralize the HOCl to get it closer to a neutral pH. Alternatively, in such embodiments, the ionic porous membrane 512 can separate the two solutions generated (e.g., the sanitizer from the detergent or the disinfectant from the detergent). As such, the portable spray bottle can include either two different delivery tubes to the spray nozzle or a toggle switch to change whether the solution provided to the spray nozzle is from a compartment containing the anode or a compartment containing the cathode.

Figure 6:
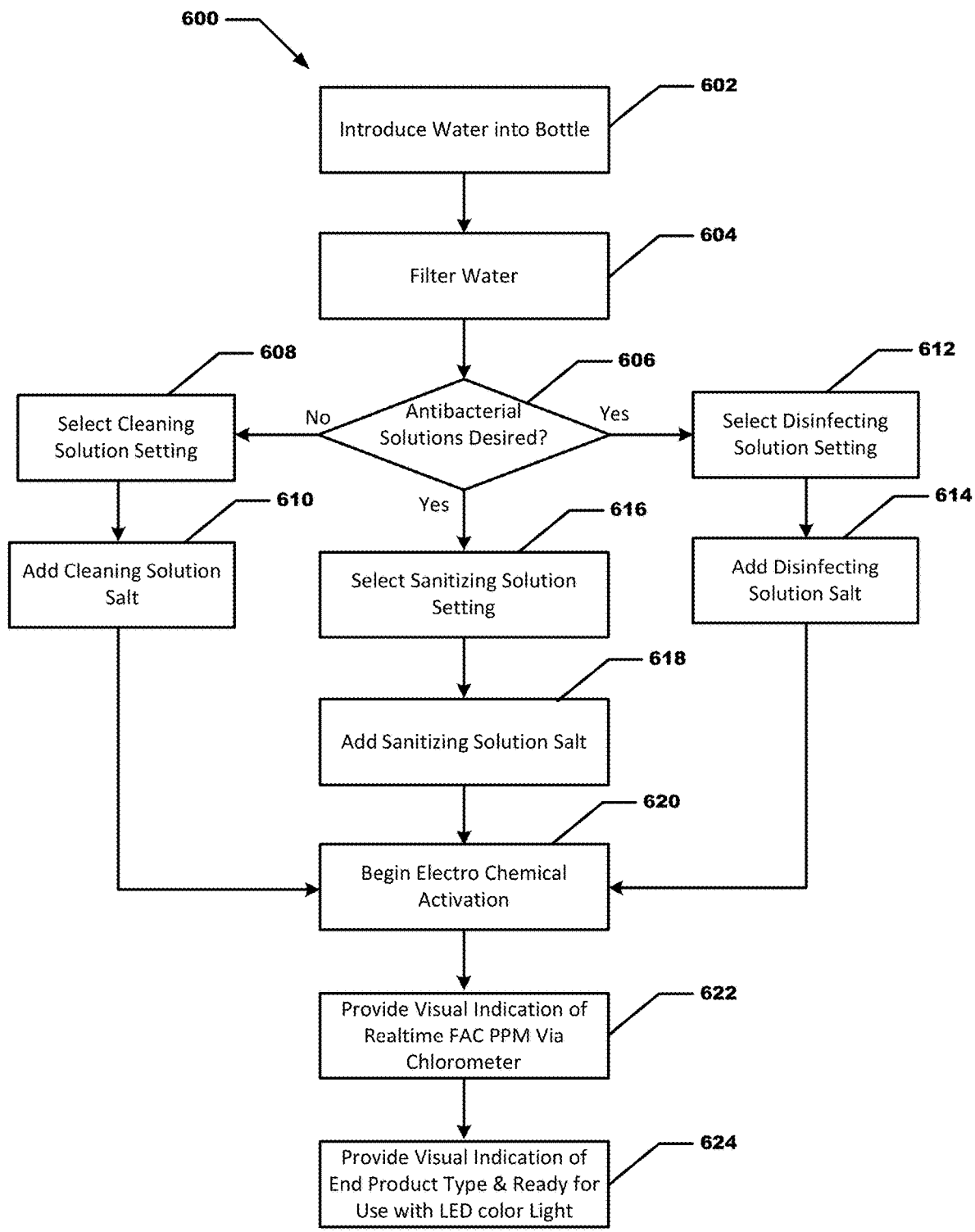
FIG. 6 is a flowchart illustrating an exemplary method for using a portable cleaning device, according to an example embodiment.

FIG. 6 is a flow diagram showing illustrative processing that can be implemented for portable electrolyzed water generation in an exemplary embodiment. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 600 begins with processing block 602, which discloses introducing water into the device. As shown in processing block 604, the water is filtered. Decision block 606 shows were the type of cleaning solution is determined. When a detergent solution is desired, processing continues with processing block 608 and as shown in processing block 610, a detergent solution salt is added to the water.

Referring back to decision block 606, when a disinfecting solution is desired, processing continues with processing block 612 and 614 wherein a disinfecting solution salt is added to the water.

Referring back again to decision block 606, when a sanitizing solution is desired, processing continues with processing block 616 and 618 wherein a sanitizing solution salt is added to the water.

The result of processing blocks 610, 614 and 618 are that a brine solution is formulated. Processing block 620 shows begin electro-chemical activation. This step converts the brine solution to the cleaning solution. Processing block 622 shows providing a visual indication of the real time FAC PPM by the chlorometer. Processing block 624 provides a visual indication of the end product type (detergent, sanitizer or disinfectant) and that the apparatus is ready to be used.

Figure 7:
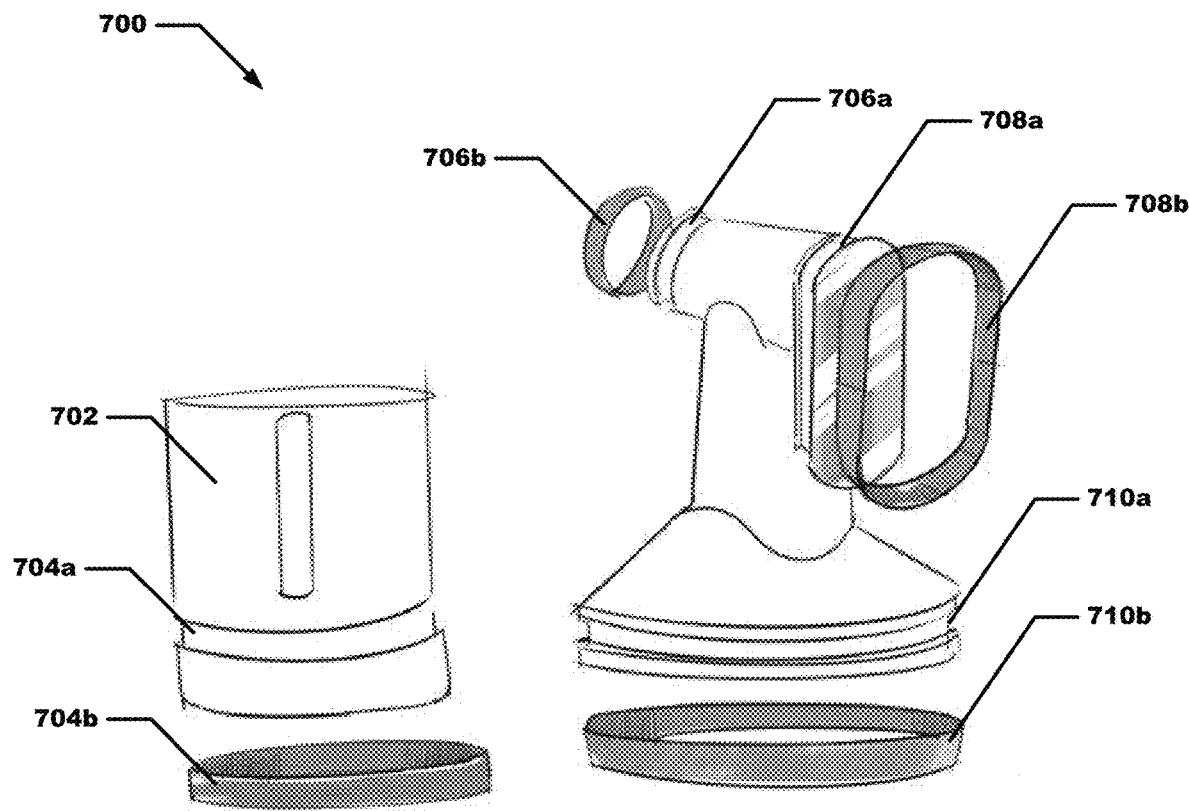
FIG. 7 is an exploded view diagram of the protective rubber guards for the device, according to an example embodiment.

Referring now to FIG. 7, an exploded view of parts of the device 700 is shown. The fluid container 702 includes a recess 704a for receiving the fluid container guard 704b. The bottle head includes a mode light recess 706a for receiving a mode light guard 706b. Also shown is a nozzle recess 708a for receiving a nozzle guard 708b. This embodiment 700 also includes a bottle head recess 710a for receiving a bottle head guard 710b. The use of one or more of the fluid container guard 704b, the mode light guard 706b, the nozzle guard 708b, and the bottle head guard 710b protect the device in the event the device is dropped or knocked over The description is presented to enable a person skilled in the art to create and use a computer system configuration and related method and systems for dynamic delivery scheduling. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. An apparatus comprising:
  a fluid container capable of storing a brine solution therein;
  an electrolytic cell disposed within the fluid container and in communication with the brine solution;
  a power source in electrical communication with the electrolytic cell;
  a pump disposed in the fluid container;
  a chlorometer disposed in the fluid container, wherein the chlorometer reads an ionic activity concentration in the cleaning solution to establish the concentration of Free Available Chlorine (FAC);
  a fluid container head in removable mechanical communication with the fluid container, the fluid container head including a nozzle in fluid communication with the pump, a trigger in electrical communication with the pump, and a power switch in communication with the power source; and
  a controller in communication with the chlorometer and the electrolytic cell, the controller operating the electrolytic cell to convert the brine solution to a cleaning solution based on the ionic activity concentration reading.

2. The apparatus of claim 1 wherein the brine solution comprises water and salt.

3. The apparatus of claim 2 wherein the brine solution further comprises citric acid.

4. The apparatus of claim 1 wherein the cleaning solution comprises one of a sanitizing solution, a disinfecting solution, and a detergent solution.

5. The apparatus of claim 1 wherein the selected concentration of FAC in the cleaning solution is substantially around 100 ppm and a pH level of the neutral range or is substantially around 500 ppm and a pH level of a neutral range.

6. The apparatus of claim 1 further comprising a display in communication with the controller, the display displaying a FAC reading of the cleaning solution.

7. The apparatus of claim 1 further comprising a filter disposed in the fluid container.

8. The apparatus of claim 1 wherein the power source comprises a battery.

9. The apparatus of claim 1 further comprising a mode light indicating whether the system is on, off, in a sanitizing mode, or in a disinfecting mode.

10. The apparatus of claim 1 wherein the salt comprises one of sodium chloride (NaCl), and potassium chloride (KCl).

11. The apparatus of claim 1 wherein the fluid container includes two chambers separated by an ionic porous membrane.

12. A method for portable electrolyzed water generation, the method comprising:
   providing an apparatus having a fluid container, an electrolytic cell disposed within the fluid container, a power source in electrical communication with the electrolytic cell, a pump disposed in the fluid container, and a chlorometer disposed in the fluid container, wherein the chlorometer reads an ionic activity concentration in the cleaning solution to establish the concentration of Free Available Chlorine (FAC);
   providing water into the fluid container;
   determining a solution selection from one of a detergent solution setting, a disinfecting solution setting and a sanitizing solution setting;
   introducing a salt solution for the solution selection into the fluid container, the salt solution reacting with the water to provide a brine; and
   providing an electro-chemical activation to the brine to provide one of the detergent solution, the disinfecting solution and the sanitizing solution based on the ionic activity concentration reading of the chlorometer.

13. The method of claim 12 further comprising providing an indication of the solution type and that the solution is ready for use.

14. The method of claim 12 wherein the providing water further comprises filtering the water.

15. The method of claim 14 further comprising adding citric acid to the brine solution.

16. The method of claim 12 further comprising displaying a FAC reading of the cleaning solution in a display.

17. The method of claim 12 wherein introducing a salt solution comprises introducing a salt solution wherein the salt comprises one of sodium chloride (NaCl), and potassium chloride (KCl).

18. The method of claim 12 wherein the providing an apparatus having a fluid container comprises providing a fluid container having two chambers separated by an ionic porous membrane.

19. The method of claim 12 wherein introducing a salt solution comprises introducing a salt solution wherein the salt comprises one of 0.2 g Citric Acid and 2 g of Sodium Chloride (NaCl), and 0.2 g Citric Acid and 2.5 g Sodium Chloride (NaCl).

* * * * *